(12) United States Patent
Kim et al.

(10) Patent No.: US 12,370,638 B2
(45) Date of Patent: Jul. 29, 2025

(54) FASTENING DEVICE AND FASTENING SYSTEM INCLUDING THE SAME

(71) Applicant: SAMSUNG ELECTRONICS CO., LTD., Suwon-si (KR)

(72) Inventors: Donghyun Kim, Suwon-si (KR); Jongseong Ko, Suwon-si (KR); Daeyong Kim, Suwon-si (KR); Jisu Kim, Suwon-si (KR); Pyungkang Kim, Suwon-si (KR); Kihong Park, Suwon-si (KR); Jungjun Park, Suwon-si (KR); Jungjoon Park, Suwon-si (KR); Jooyoung Park, Suwon-si (KR); Junhyeok Park, Suwon-si (KR); Hoseok Song, Suwon-si (KR); Chiho Ahn, Suwon-si (KR); Kongwoo Lee, Suwon-si (KR); Hyunyoung Lee, Suwon-si (KR); Chuyoung Choung, Suwon-si (KR); Jeongmin Hwang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/657,146

(22) Filed: May 7, 2024

(65) Prior Publication Data
US 2024/0375227 A1    Nov. 14, 2024

(30) Foreign Application Priority Data

May 9, 2023    (KR) .................... 10-2023-0059964
Jul. 7, 2023    (KR) .................... 10-2023-0088674

(51) Int. Cl.
B23P 19/06    (2006.01)
B23Q 5/10    (2006.01)

(52) U.S. Cl.
CPC ............. *B23P 19/069* (2013.01); *B23Q 5/10* (2013.01)

(58) Field of Classification Search
CPC ......... B23P 19/069; B23P 19/06; B23P 19/04; B23P 19/00; B23Q 5/10; B23Q 5/04; B23Q 5/02; B23Q 5/00
See application file for complete search history.

(56) References Cited

U.S. PATENT DOCUMENTS

| | | | | |
|---|---|---|---|---|
| 3,675,302 A | * | 7/1972 | Dixon .................... | B23P 19/06 29/709 |
| 4,358,228 A | * | 11/1982 | Stark .................. | B23Q 3/15706 408/35 |

(Continued)

FOREIGN PATENT DOCUMENTS

| | | |
|---|---|---|
| CN | 111958227 A | 11/2020 |
| JP | 2015-080843 A2 | 4/2015 |

(Continued)

*Primary Examiner* — Lawrence Averick
(74) *Attorney, Agent, or Firm* — MORGAN, LEWIS & BOCKIUS LLP

(57) ABSTRACT

A fastening device includes: a support portion including a first end portion, and a second end portion, and a central portion between the first and second end portions; a first pulley, a second pulley, and a third pulley rotatably disposed on the central portion, the first end portion, and the second end portion, respectively; a first connection portion and a second connection portion respectively rotatably disposed on the first and second end portions and respectively connected to the second and third pulleys; a first fastening tool and a second fastening tool respectively connected to the first and second connection portions; and a motor connected to the first pulley, wherein a force generated by the motor and provided to the first pulley is at least partially transmitted to the second and third pulleys to vary a distance between the first and second fastening tools.

20 Claims, 13 Drawing Sheets

(56) References Cited

U.S. PATENT DOCUMENTS

| | | | |
|---|---|---|---|
| 7,503,108 B2 * | 3/2009 | Zolotarev | ............... B23Q 5/40 |
| | | | 29/757 |
| 9,376,266 B2 * | 6/2016 | Kira | ..................... B23P 19/069 |
| 2005/0005412 A1 * | 1/2005 | Zolotarev | ............... B23Q 5/40 |
| | | | 29/407.02 |
| 2014/0140802 A1 * | 5/2014 | Kira | ..................... B65G 47/14 |
| | | | 414/754 |
| 2020/0391334 A1 * | 12/2020 | Seemaier | ............ B23Q 3/1554 |

FOREIGN PATENT DOCUMENTS

| | | |
|---|---|---|
| JP | 2015-112699 A2 | 6/2015 |
| KR | 10-2394421 B1 | 5/2022 |
| WO | 2016020973 | 6/2017 |

\* cited by examiner

FASTENING DEVICE AND FASTENING SYSTEM INCLUDING THE SAME

CROSS-REFERENCE TO RELATED APPLICATIONS

This application claims priority under 35 U.S.C. § 119 from Korean Patent Application No. 10-2023-0059964, filed on May 9, 2023, in the Korean Intellectual Property Office and Korean Patent Application No. 10-2023-0088674, filed on Jul. 7, 2023, in the Korean Intellectual Property Office, the contents of which are herein incorporated by reference in their entirety.

BACKGROUND

1. Technical Field

The present disclosure relates to a fastening device and a fastening system including the same.

2. Discussion of Related Art

Periodic maintenance of semiconductor facilities may include fastening and/or loosening numerous bolts. A work time may increase with a number of bolts to be fastened and/or loosened during the periodic maintenance. In some applications, bolts of a work piece may need to be torqued to a specification, applying a uniform pressure across the work piece. In some cases, it may be difficult to obtain a uniform surface pressure distribution across the work piece.

SUMMARY

Aspects of the present disclosure provide a fastening device capable of simultaneously fastening and/or disassembling a work target part secured by bolts disposed at various radii.

Aspects of the present disclosure also provide a fastening system capable of simultaneously fastening and/or disassembling a work target part secured by bolts disposed as various radii.

Aspects of the present disclosure are not restricted to those set forth herein. The above and other aspects of the present disclosure will become more apparent to one of ordinary skill in the art to which the present disclosure pertains by referencing the detailed description of the present disclosure given below.

According to an aspect of the present disclosure, there is provided a fastening device including: a support portion including a first end portion and a second end portion, and a central portion between the first end portion and the second end portion; a first pulley, a second pulley, and a third pulley rotatably disposed on the central portion, the first end portion, and the second end portion, respectively; a first connection portion and a second connection portion respectively rotatably disposed on the first end portion and the second end portion and respectively connected to the second pulley and the third pulley; a first fastening tool and a second fastening tool respectively connected to the first connection portion and the second connection portion; and a motor connected to the first pulley, wherein a force generated by the motor and provided to the first pulley is at least partially transmitted to the second pulley and the third pulley to vary a distance between the first fastening tool and the second fastening tool.

According to another aspect of the present disclosure, there is provided a fastening device including: a support portion including a first end portion and a second end portion, and a central portion between the first end portion and the second end portion; a first pulley, a second pulley, and a third pulley rotatably disposed about a first shaft, a second shaft, and a third shaft disposed on the central portion, the first end portion, and the second end portion, respectively; a first connection portion and a second connection portion respectively disposed on the first end portion and the second end portion, and respectively connected to the second pulley and the third pulley; a first fastening tool and a second fastening tool respectively connected to the first connection portion and the second connection portion; and a motor generating a force for rotating the first pulley, the second pulley, and the third pulleys, wherein the force generated by the motor simultaneously rotates the first fastening tool and the second fastening tool relative to the support portion.

According to still another aspect of the present disclosure, there is provided a fastening device including: a support portion including a first end portion and a second end portion, and a central portion between the first end portion and the second end portion; a first pulley, a second pulley, and a third pulleys rotatably disposed about a first shaft, a second shaft, and a third shaft on the central portion, the first end portion, and the second end portion, respectively; a first connection portion and a second connection portion respectively disposed on the first end portion and the second end portion and respectively connected to the second pulley and the third pulley; a first fastening tool and a second fastening tool respectively connected to the first connection portion and the second connection portion; a motor generating a force for rotating the first pulley, the second pulley, and the third pulley; and a motor controller for controlling the motor, wherein the force is provided to the first pulley by the motor, the force is transmitted from the first pulley to the second pulley and the third pulley, and the first connection portion and the second connection portion rotate, relative to the support portion, by the force transmitted to the second pulley and the third pulley.

Details of exemplary embodiments are included in the detailed description and drawings.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Hereinafter, a fastening device according to some exemplary embodiments will be described with reference to FIGS. 1 to 5.

Terms "first", "second", and the like are used herein to describe various elements or components, but these elements or components are not limited by these terms. These terms are used only to distinguish one element or component from another element or component. Therefore, a first element or component mentioned below may be a second element or component within the technical spirit of the present disclosure.

Figure 1:
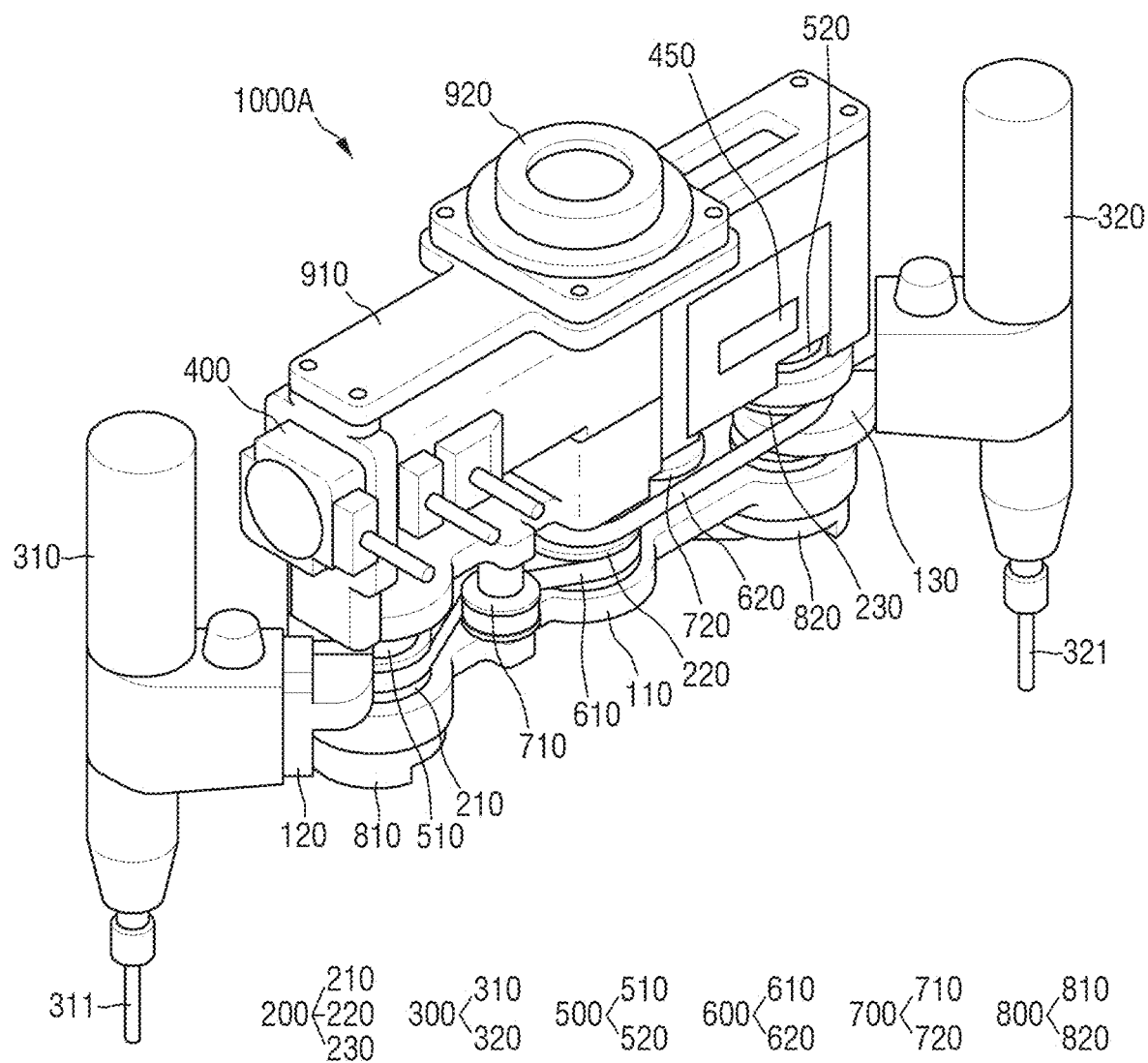
FIG. 1 is an exemplary perspective view for describing a fastening device according to some exemplary embodiments.
Figure 2:
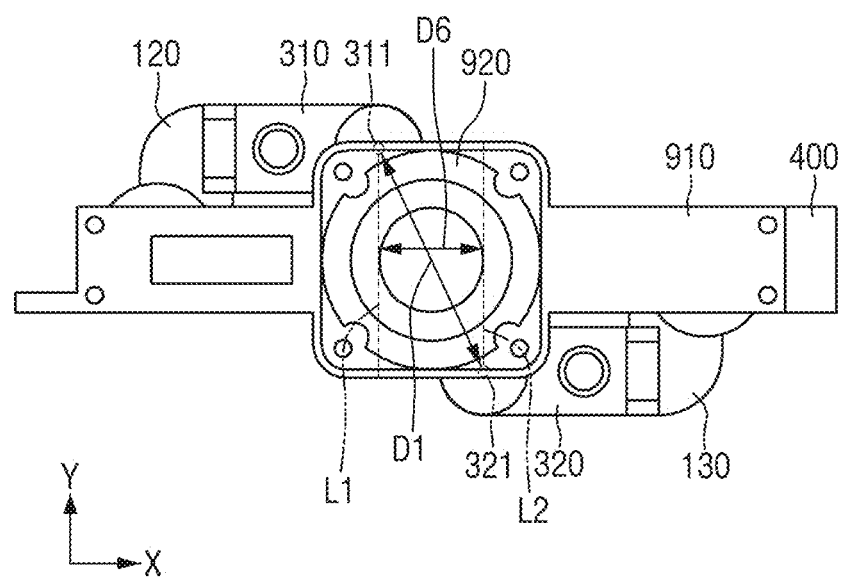
FIG. 2, FIG. 3, and FIG. 4 are schematic plan views for describing an operation of the fastening device according to some exemplary embodiments.
Figure 3:
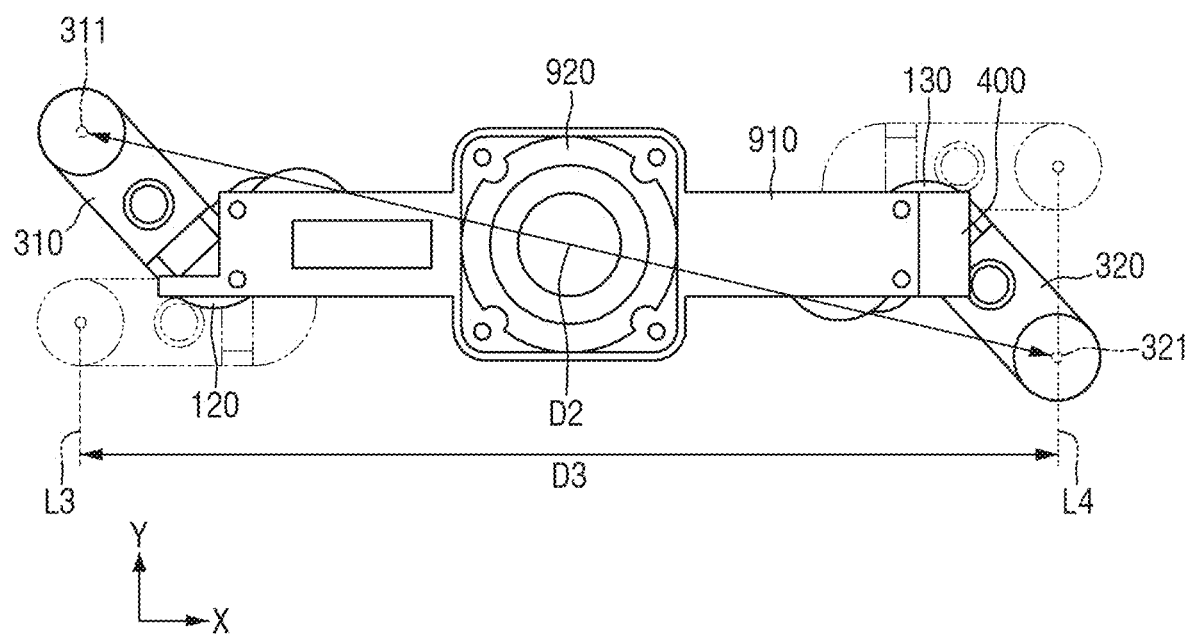
Figure 4:
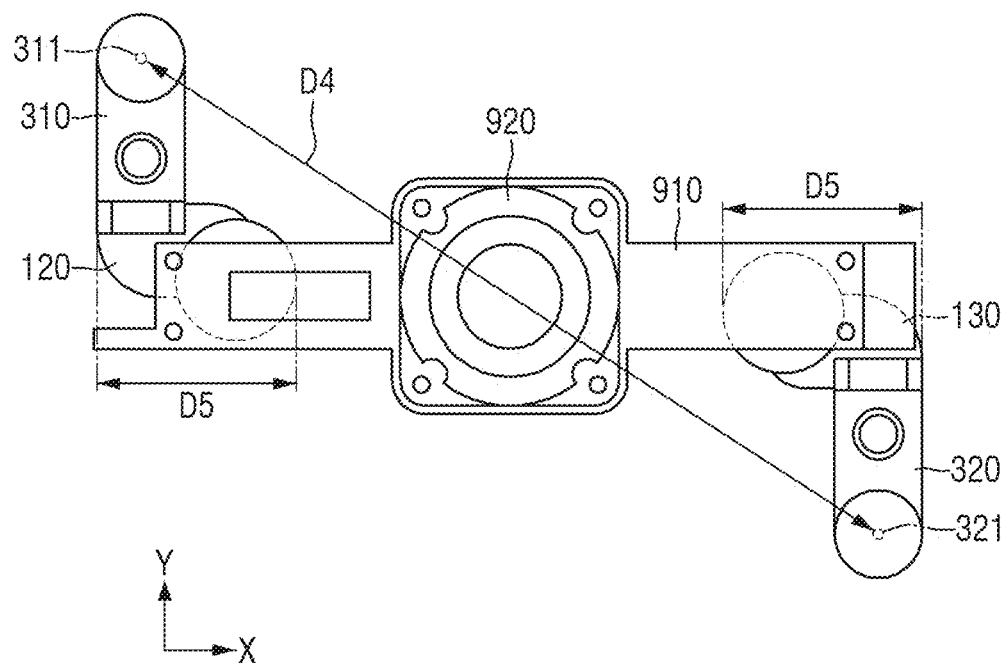
Figure 5:
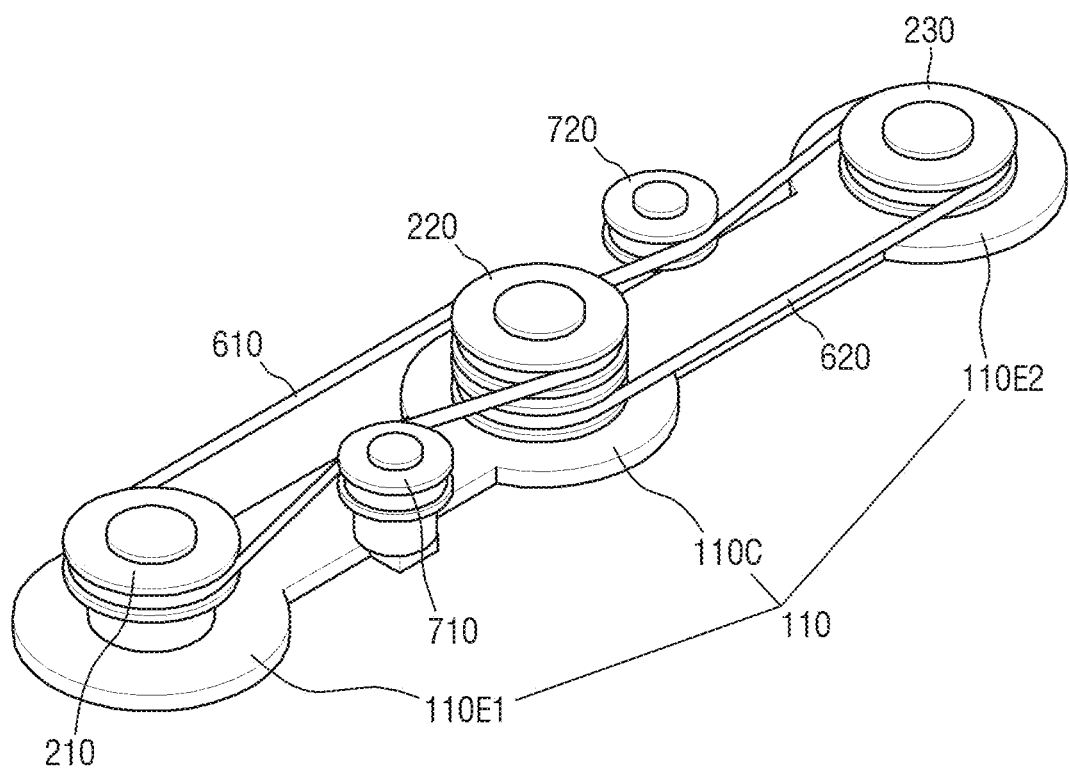
FIG. 5 is a schematic view for describing a support portion and a pulley of the fastening device according to some exemplary embodiments.

FIG. 1 is an exemplary perspective view for describing a fastening device according to some exemplary embodiments. FIG. 2, FIG. 3, and FIG. 4 are schematic plan views for describing an operation of the fastening device according to some exemplary embodiments. FIG. 5 is a schematic view for describing a support portion and a pulley of the fastening device according to some exemplary embodiments.

Referring to FIG. 1, a fastening device 1000A according to some exemplary embodiments may include a support portion 110, a first connection portion 120 and a second connection portion 130, a pulley structure 200, automatic fastening tools 300, a motor 400, and a motor controller 450. The fastening device 1000A may further include a bearing structure 500, a belt structure 600, idle wheels 700, an encoder structure 800, a frame 910, and a connector 920.

In some exemplary embodiments, the fastening device 1000A may refer to a device used for fastening and/or disassembling a work target part secured by fasteners, such as bolts or screws. In some exemplary embodiments, the fastening device 1000A may refer to a device used for fastening and/or loosening fasteners securing the work target part.

In some exemplary embodiments, a first direction X may refer to a direction in which an upper surface of a support portion 110 extends. A second direction Y may refer to a direction parallel to the upper surface of the support portion 110 and intersecting the first direction X. A third direction Z may refer to a direction perpendicular to the upper surface of the support portion 110 and intersecting each of the first and second directions X and Y to be perpendicular to each of the first and second directions X and Y.

Referring to FIG. 1 and FIG. 5 together, the support portion 110 may include a first end portion 110E1, a second end portion 110E2, and a central portion 110C between the first and second end portions 110E1 and 110E2. The support portion 110 may support components of the fastening device 1000A. The support portion 110 may entirely support the components of the fastening device 1000A.

The first connection portion 120 may be disposed on the first end portion 110E1 and the second connection portion 130 may be disposed on the second end portion 110E2. The first connection portion 120 may be connected to a second pulley 210 and the second connection portion 130 may be connected to a third pulley 230.

The pulley structure 200 may include a first pulley 220, the second pulley 210 and the third pulley 230. The first to third pulleys 220, 210, and 230 may be respectively disposed on the central portion 110C, the first end portion 110E1, and the second end portion 110E2 of the support portion 110. For example, the second and third pulleys 210 and 230 may be spaced apart from each other. More particularly, the first pulley 220 may be disposed between the second pulley 210 and the third pulley 230. The first to third pulleys 220, 210, and 230 may be disposed on the central portion 110C.

The first pulley 220 may be rotatably disposed around a first shaft, the second pulley 210 may be rotatably disposed around a second shaft, and the third pulley 230 may be rotatably disposed around a third shaft. As the second pulley 210 rotates, the first connection portion 120 may rotate, and as the third pulley 230 rotates, the second connection portion 130 may rotate.

The automatic fastening tools 300 may include a first fastening tool 310 and a second fastening tool 320. For example, each of the first and second fastening tools 310 and 320 may be a screwdriver, a socket, or a hex key, but is not limited thereto.

The first fastening tool 310 may be connected to the first connection portion 120 and the second fastening tool 320 may be connected to the second connection portion 130. A first fastening tip 311 may be mounted on the first fastening tool 310 and a second fastening tip 321 may be mounted on the second fastening tool 320. The first and second fastening tips 311 and 321 may be driven to fasten and/or loosen fasteners. The first and second fastening tips 311 and 321 may be driven to simultaneously fasten and/or loosen the fasteners.

As the first and second connection portions 120 and 130 rotate, a distance between the first and second fastening tools 310 and 320 may be varied. As the first and second connection portions 120 and 130 rotate, a position of the first and second fastening tools 310 and 320 may be varied. That is, the first and second connection portions 120 and 130 may rotate so that a distance between the first fastening tip 311 and the second fastening tip 321 may be changed.

The motor 400 may generate a force for rotating the first pulley 220. At least a portion of the force applied to the first pulley 220 may be transmitted to the second pulley 210 and the third pulley 230. That is, the motor 400 may generate a force for rotating the first to third pulleys 220, 210, and 230.

The motor 400 may be connected to the first pulley 220. The motor 400 may be directly or indirectly connected to the first pulley 220. For example, the motor 400 and the first pulley 220 may be connected by a first shaft, which may be an output shaft of the motor 400 and may provide a force generated by the motor 400 to the first pulley 220, but is not limited thereto. In another example, the motor 400 and the first pulley 220 may be connected by a gear, and the first shaft. In yet another example, the motor 400 and the first pulley 220 may be connected by a magnetic drive.

When the force generated by the motor 400 is provided to the first pulley 220, the second and third pulleys 210 and 230 may rotate and the distance between the first and second fastening tools 310 and 320 may be varied. When the force is provided to the first to third pulleys 220, 210, and 230, the first and second fastening tools 310 and 320 may simultaneously rotate in a state in which the support portion 110 is fixed. For example, when the force is provided to the first to third pulleys 220, 210, and 230, the first and second fastening tools 310 and 320 may simultaneously rotate relative to a position on the support portion 110. The first and second fastening tools 310 and 320 may simultaneously rotate relative to respective positions on the support portion 110.

The motor controller 450 may control the force provided to the first pulley 220. That is, the motor controller 450 may control the force provided to the first to third pulleys 220, 210, and 230 by controlling the motor 400.

When the force is provided to the first pulley 220 by the motor controller 450, the force may be transmitted to the second and third pulleys 210 and 230. By the transmitted force, the first and second connection portions 120 and 130 may simultaneously rotate in the state in which the support portion 110 is fixed. For example, the first and second connection portions 120 and 130 may simultaneously rotate relative to a position on the support portion 110.

The bearing structure 500 may include a first bearing (not illustrated), and a second bearing 510 and a third bearing 520.

The first bearing (not illustrated) may support a first shaft around which the first pulley 220 may rotate. The second bearing 510 may support a second shaft around which the second pulley 210 may rotate. The third bearing 520 may support a third shaft around which the third pulley 230 may rotate. The first to third bearings may constrain motion of the first to third shafts, respectively, such that the first to third shafts may rotate within the first to third bearings, respectively. The first to third shafts may rotate within the first to third bearings, respectively, and the power generated by the motor 400 may be transmitted to the first to third pulleys 220, 210, 230. That is, the first to third pulleys 220, 210, 230 may be disposed on the first to third shafts, respectively.

The belt structure 600 may include a first belt 610 and a second belt 620. The first belt 610 may connect the first pulley 220 and the second pulley 210. The second belt 620 may connect the first pulley 220 and the third pulley 230. The force generated by the motor 400 may be at least partially transmitted from the first pulley 220 to the second pulley 210 by the first belt 610. The force generated by the motor 400 may be at least partially transmitted from the first pulley 220 to the third pulley 230 by the second belt 620.

The idle wheels 700 may include a first idle wheel 710 and a second idle wheel 720. The first and second idle wheels 710 and 720 may provide tension to the first and second belts 610 and 620, respectively. The first and second idle wheels 710 and 720 may provide tension by tightening the first and second belts 610 and 620, respectively.

The encoder structure 800 may include a first encoder 810 and a second encoder 820. The first and second encoders 810 and 820 may detect information about changes in positions, intervals, directions, and/or angles of the first and second fastening tools 310 and 320. Although not specifically illustrated, the fastening device 1000A according to some exemplary embodiments may further include an output unit outputting the information detected by the first and second encoders 810 and 820. For example, the information detected by the first and second encoders 810 and 820 may be output by the output unit as an electrical signal.

The frame 910 may be disposed on the support portion 110 and the first to third pulleys 220, 210, and 230. The frame 910 may cover at least a portion of the motor 400.

The connector 920 may be disposed on the frame 910. The connector 920 may be disposed on the frame 910 in a first axial direction, which may correspond to the first pulley 220. The connector 920 may be a structure connected to a manipulator 1000B.

Referring to FIG. 2, each of the first and second connection portions 120 and 130 may rotate toward an inside of the frame 910, and a distance between the first fastening tip 311 and the second fastening tip 321 may become a first distance D1. In this case, a length of the fastening device 1000A in the first direction X may be substantially the same as a length of the support portion 110 in the first direction X.

In the fastening device 1000A according to some exemplary embodiments, the first distance D1 between the first fastening tip 311 and the second fastening tip 321 may be a minimum separation distance between the first and second fastening tools 310 and 320. Each of the first and second fastening tools 310 and 320 may be folded toward the inside of the frame 910. In a closed position of the first and second connection portions 120 and 130, the first and second connection portions 120 and 130 may be rotated toward the inside of the frame 910 and may be completely folded toward the inside of the frame 910. For example, the first distance D1 between the first fastening tip 311 and the second fastening tip 321 when the first and second connection portions 120 and 130 are in the closed position may be 80 mm, but is not limited thereto.

Referring to FIG. 3, each of the first and second connection portions 120 and 130 may rotate toward an outside of the frame 910 so that the distance between the first fastening tip 311 and the second fastening tip 321 may become a second distance D2. For example, the second distance D2 between the first fastening tip 311 and the second fastening tip 321 may be 360 mm, but is not limited thereto. In the fastening device 1000A according to some exemplary embodiments, when the first fastening tool 310 and the frame 910 may form an angle of about 135 degrees and the second fastening tool 320 and the frame 910 may form an angle of about 135 degrees, the first fastening tip 311 and the second fastening tip 321 may be spaced apart from each other at a maximum separation distance.

Each of the first and second fastening tools 310 and 320 may rotate toward the outside of the frame 910 through an angle of about 180 degrees or more. In the fastening device 1000A according to some exemplary embodiments, when the first fastening tool 310 and the frame 910 may form an angle of about 180 degrees and the second fastening tool 320 and the frame 910 may form an angle of about 180 degrees, the first fastening tip 311 and the second fastening tip 321 may be spaced apart from each other at a maximum separation distance. In this case, a third distance D3 may refer to a distance along the first direction X between a third imaginary line L3 extending from the first fastening tip 311 along the second direction Y and a fourth imaginary line L4 extending from the second fastening tip 321 along the second direction Y.

Referring to FIG. 4, the first and second connection portions 120 and 130 may rotate, respectively, so that an angle between the frame 910 and the first connection portion 120 may be about 180 degrees and an angle between the frame 910 and the second connection portion 130 may be about 180 degrees. The distance between the first fastening tip 311 and the second fastening tip 321 may be a fourth distance D4 different from each of the first to third distances D1, D2, and D3.

Referring to FIG. 2, FIG. 3, and FIG. 4 together, the third distance D3 of FIG. 3 may be substantially the same as a sum of a fifth distance D6 of FIG. 2 and four times a length D5 of each of the first and second connection portions 120 and 130 of FIG. 4.

Referring to FIG. 2, the fifth distance D6 may refer to a distance along the first direction X between a first imaginary line L1 extending from the first fastening tip 311 along the second direction Y and a second imaginary line L2 extending from the second fastening tip 321 along the second direction Y.

Referring to FIG. 3, the third distance D3 between the first fastening tip 311 and the second fastening tip 321 may be less than the second distance D2 between the first fastening tip 311 and the second fastening tip 321.

Referring to FIG. 4, the fourth distance D4 between the first fastening tip 311 and the second fastening tip 321 may be longer than the first distance D1 and shorter than the third distance D3.

Figure 6:
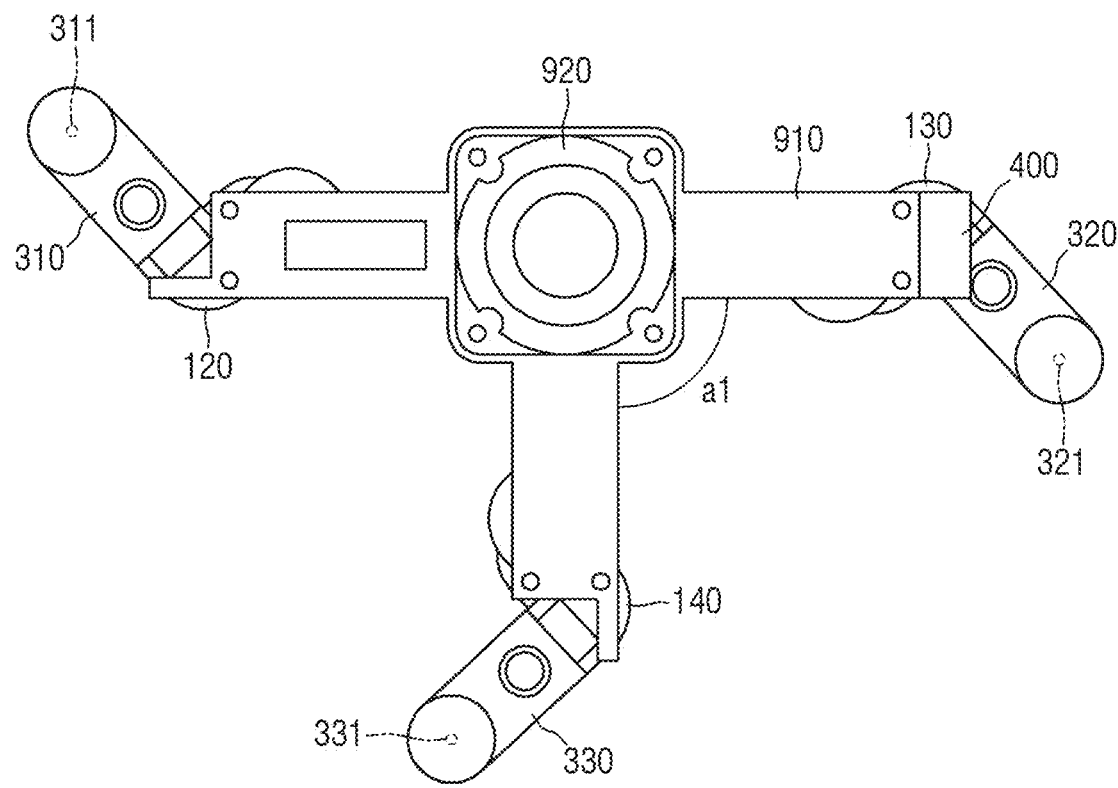
FIG. 6 and FIG. 7 are exemplary views for describing the fastening device according to some exemplary embodiments.
Figure 7:
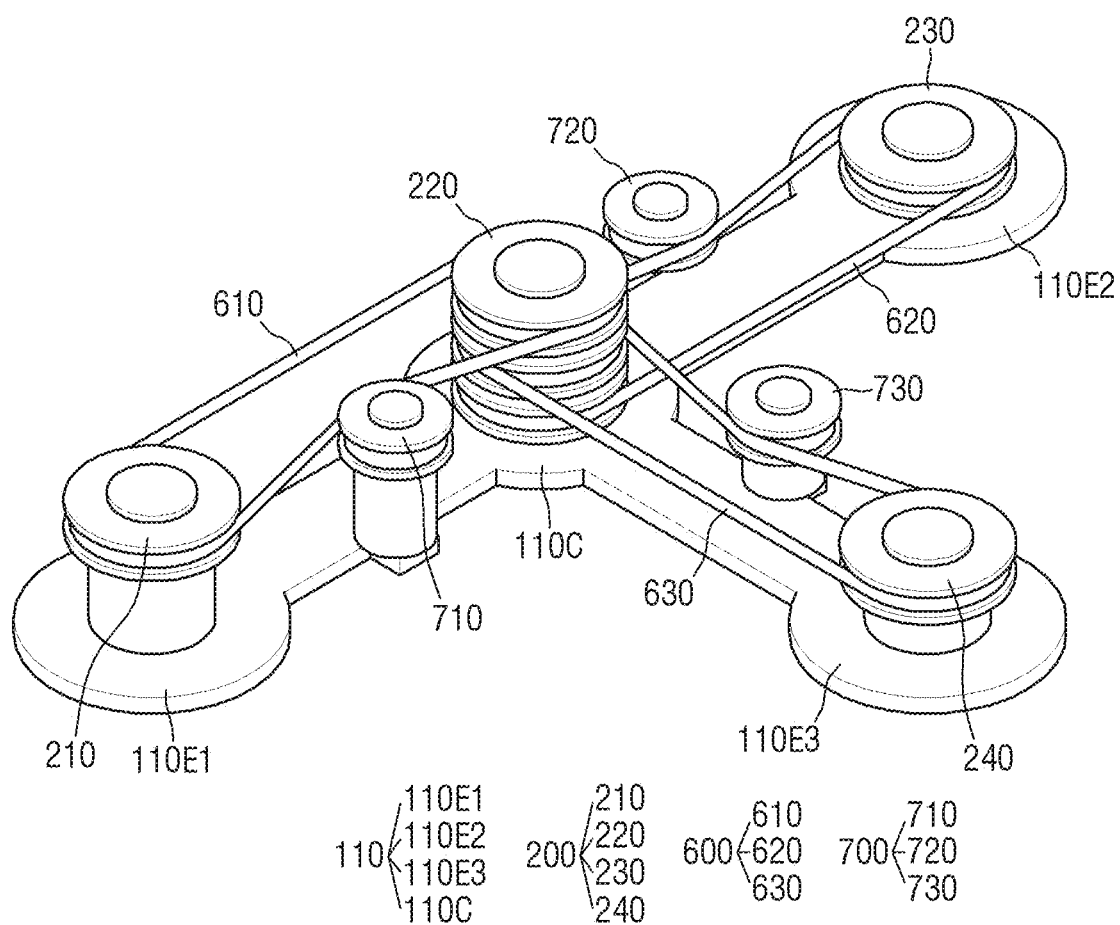

FIG. 6 and FIG. 7 are exemplary views for describing a fastening device according to some exemplary embodiments. For convenience of explanation, portions overlapping those described above with reference to FIGS. 1 to 5 may be briefly described or omitted.

Referring to FIG. 6 and FIG. 7, the fastening device 1000A according to some exemplary embodiment may include a support portion 110. The support portion 110 include a third end portion 110E3, a third connection portion 140, a fourth pulley 240, and a third fastening tool 330. The fastening device 1000A may further include a third belt 630 and a third idle wheel 730.

The support portion 110 may further include a third end portion 110E3. The first and second end portions 110E1 and 110E2, and third end portion 110E3 may each extend from the central portion 110C. The third end portion 110E3 may be disposed spaced apart from each of the first and second end portions 110E1 and 110E2. The third end portion 110E3 may be disposed between the first and second end portions 110E1 and 110E2. An angle formed by the first end portion 110E1 and the second end portion 110E2 relative to the central portion 110C may be about 180 degrees. An angle a1 formed by the second end portion 110E2 and the third end portion 110E3, and an angle formed by the first end portion 110E1 and the third end portion 110E3 may be the same. The angle a1 formed by the second end portion 110E2 and the third end portion 110E3 relative to the central portion 110C, and the angle formed by the first end portion 110E1 and the third end portion 110E3 relative to the central portion 110C may be about 90 degrees. The first, second, and third end portions 110E1, 110E2, and 110E3 may be disposed at different angles. For example, the angle a1 formed between the second end portion 110E2 and the third end portion 110E3 may be 120 degrees, but is not limited thereto.

The third connection portion 140 may be disposed on the third end portion 110E3 and connected to a fourth pulley 240.

The fourth pulley 240 may be rotatably disposed about a fourth shaft on the third end portion 110E3. When the force generated by the motor 400 is provided to the first pulley 220, the fourth pulley 240 may rotate. As the second to fourth pulleys 210, 230, and 240 rotate, distances between the first to third fastening tools 310, 320, and 330 may be varied.

The third fastening tool 330 may be connected to the third connection portion 140. In the state in which the support portion 110 is fixed, the first to third fastening tools 310, 320, and 330 may simultaneously rotate. For example, the first to third fastening tools 310, 320, and 330 may simultaneously rotate relative to the support portion 110 and the frame 910. A third fastening tip 331 may be mounted on the third fastening tool 330. The third fastening tip 331 may be driven to fasten or loosen the bolt.

The third belt 630 may connect the first pulley 220 and the fourth pulley 240. The force may be transmitted from the first pulley 220 to the fourth pulley 240 by the third belt 630.

The third idle wheel 730 may provide tension to the third belt 630. The third idle wheel 730 may provide tension by tightening the third belt 630.

Although not specifically illustrated, a fourth bearing (not illustrated) may support a fourth shaft around, which the fourth pulley 240 may rotate around. In addition, a third encoder (not illustrated) may detect information about a change in position, interval, direction, and/or angle of the third fastening tool 330. Furthermore, the fastening device 1000A according to some exemplary embodiments may further include an output unit. The output unit may output the information detected by the third encoder (not illustrated). The output unit may output the information as an electrical signal.

In addition, although not specifically illustrated, the support portion 110 according to some exemplary embodiments may include a fourth end portion, a fourth connection portion, a fifth pulley, and a fourth fastening tool, and may further include a fourth belt and a fourth idle wheel. That is, the number of fastening tools included in the fastening device 1000A according to some exemplary embodiments may be two or more.

Hereinafter, the fastening device and a fastening system including the same according to some exemplary embodiments will be described with reference to FIGS. 1 to 7 and FIGS. 8 to 13.

FIG. 8, FIG. 9, FIG. 10, FIG. 11, and FIG. 12 are views for describing a fastening system including a fastening device according to some exemplary embodiments. FIG. 13 is a flowchart for describing an operation of the fastening device according to some exemplary embodiments. For convenience of explanation, portions overlapping those described herein with reference to FIGS. 1 to 7 may be briefly described or omitted.

In some exemplary embodiments, the fastening device 1000A and a manipulator 1000B may be referred to as a fastening system.

Figure 8:
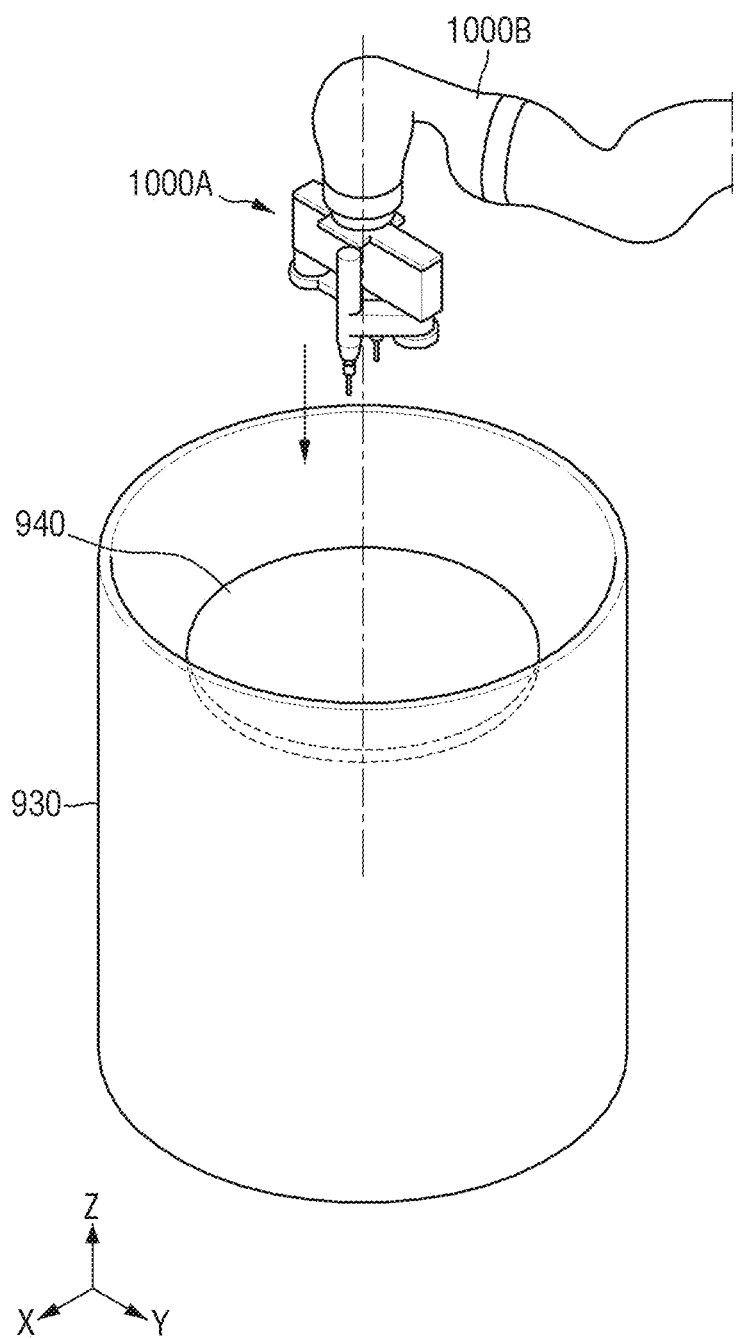
FIG. 8, FIG. 9, FIG. 10, FIG. 11, and FIG. 12 are views for describing a fastening system including a fastening device according to some exemplary embodiments.

Referring to FIG. 8 and FIG. 13, an end portion of the manipulator 1000B and the connector 920 of the fastening device 1000A may be connected. The fastening device 1000A may be disposed at a chamber 930 housing a work target part 940. For example, the fastening device 1000A may be disposed above the chamber 930, which may house the work target part 940. The fastening device 1000A may approach the work target part 940. More particularly, the fastening device 1000A may approach the work target part 940 while being aligned in the vertical direction Z with a central portion of the work target part 940 (S100). The manipulator 1000B may align the fastening device 1000A with the central portion of the work target part 940 in the vertical direction Z.

In some exemplary embodiments, the manipulator 1000B may be a robot arm, but is not limited thereto. In addition, in some exemplary embodiments, the work target part 940 may be secured by fasteners, such as bolts, and the fasteners may be fastened or loosened.

Figure 9:
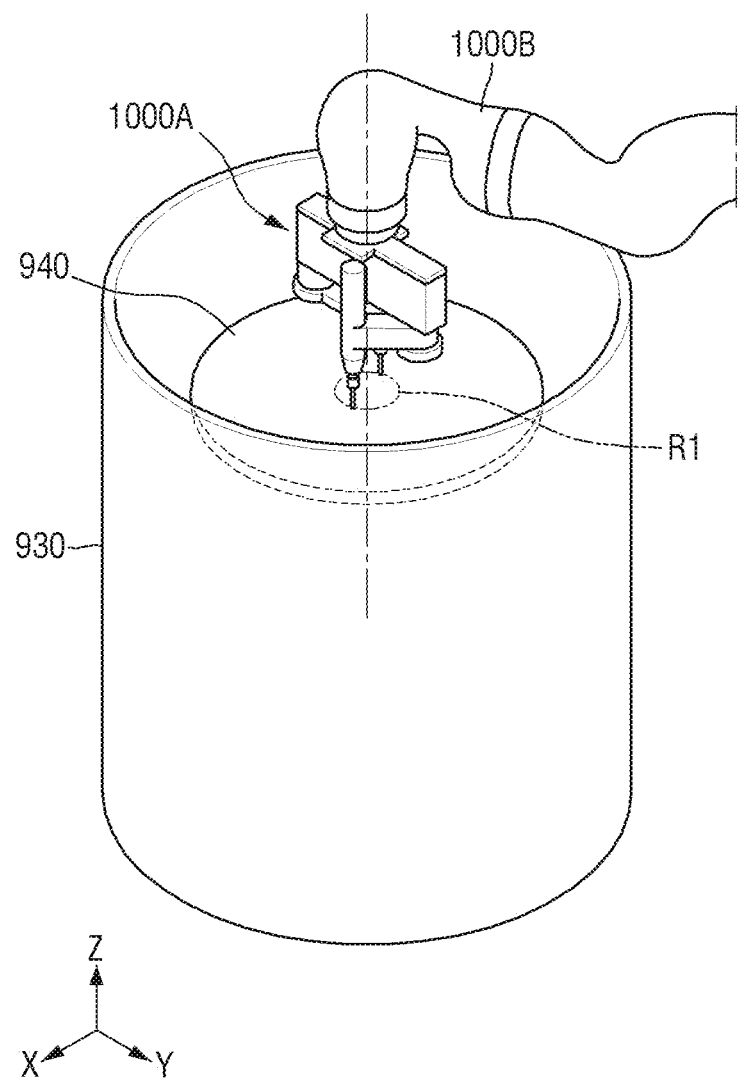

Referring to FIG. 9 and FIG. 13, the fastening device 1000A may be inserted into the chamber 930. The first and second fastening tips 311 and 321 of the fastening device 1000A may be disposed to correspond to a first work region R1 having a first circumference. In some exemplary embodiments, even when the work target part 940 is positioned inside the chamber 930, the fastening and/or loosening of the fasteners may be efficiently performed.

The fasteners may be disposed on the circumference of the first work region R1. For example, the fastening and/or loosening of the fasteners may be performed while adjusting an interval between the first and second fastening tips 311 and 321 according to a diameter of the first work region R1 (S200). For example, adjustments may be made in the interval between the first and second fastening tips 311 and 321 according to a diameter of the first work region R1 (S200) while fastening and/or loosening of the fasteners.

Figure 10:
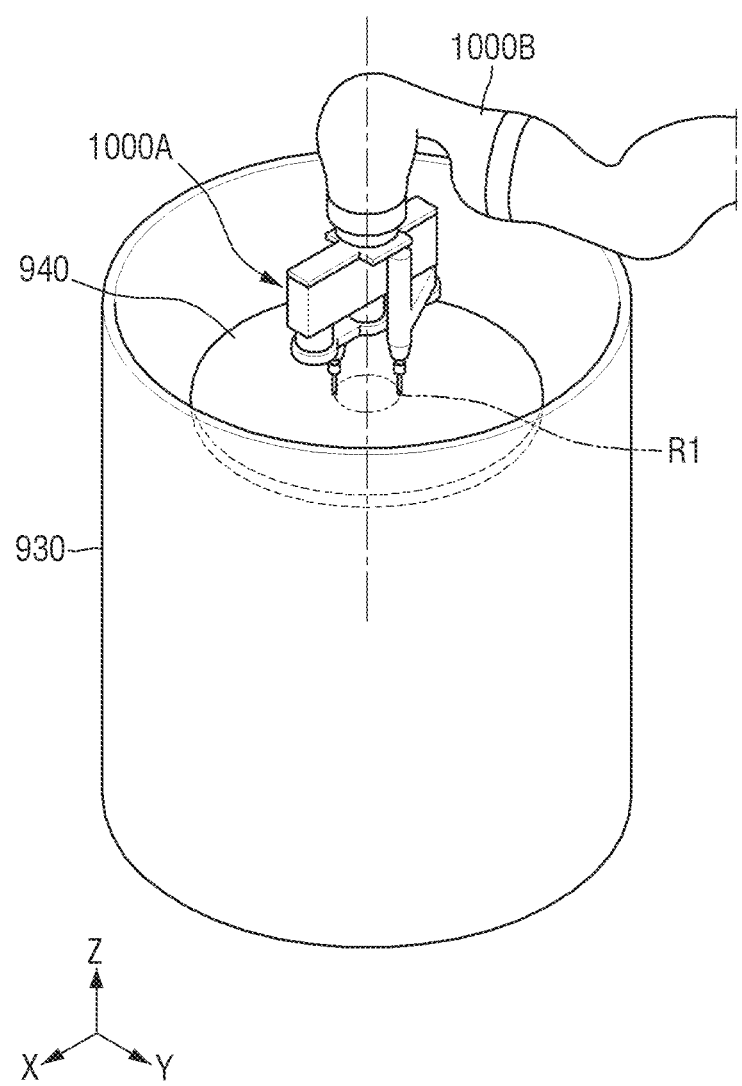

Referring to FIG. 10 and FIG. 13, the fastening device 1000A may be rotated compared to a rotation angle illustrated in FIG. 9. For example, the fastening device 1000A may be rotated by 90 degrees compared to the rotation angle illustrated in FIG. 9. The fastening device 1000A may perform a work of fastening and/or loosening the fasteners disposed on the circumference of the first work region R1 (S300). In FIGS. 9 and 10, the rotation angle and rotation direction of the fastening device 1000A are not limited to those illustrated.

Figure 11:
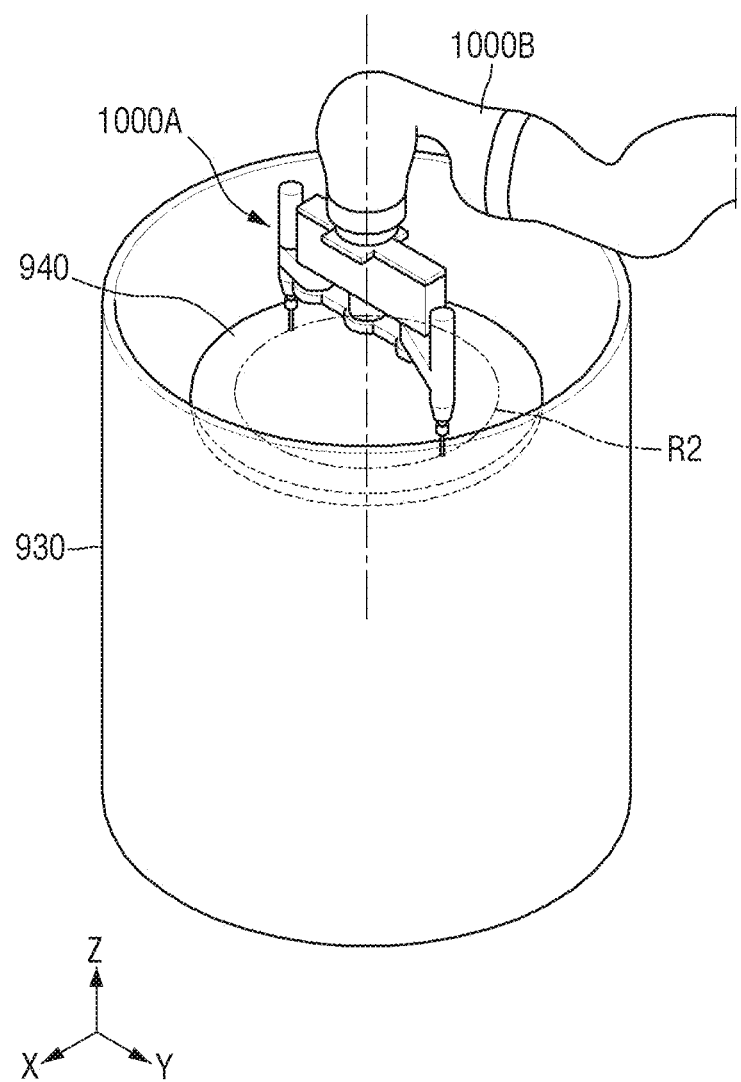

Referring to FIG. 11 and FIG. 13, the first and second fastening tips 311 and 321 of the fastening device 1000A may be disposed to correspond to a second work region R2 having a second circumference different from the first circumference. For example, the second circumference may be greater than the first circumference. Fasteners may be disposed on the circumference of the second work region R2. For example, the fastening and/or loosen fasteners securing the work target part 940 may be performed while re-adjusting an interval between the first and second fastening tips 311 and 321 according to a diameter of the second work region R2 (S400).

Figure 12:
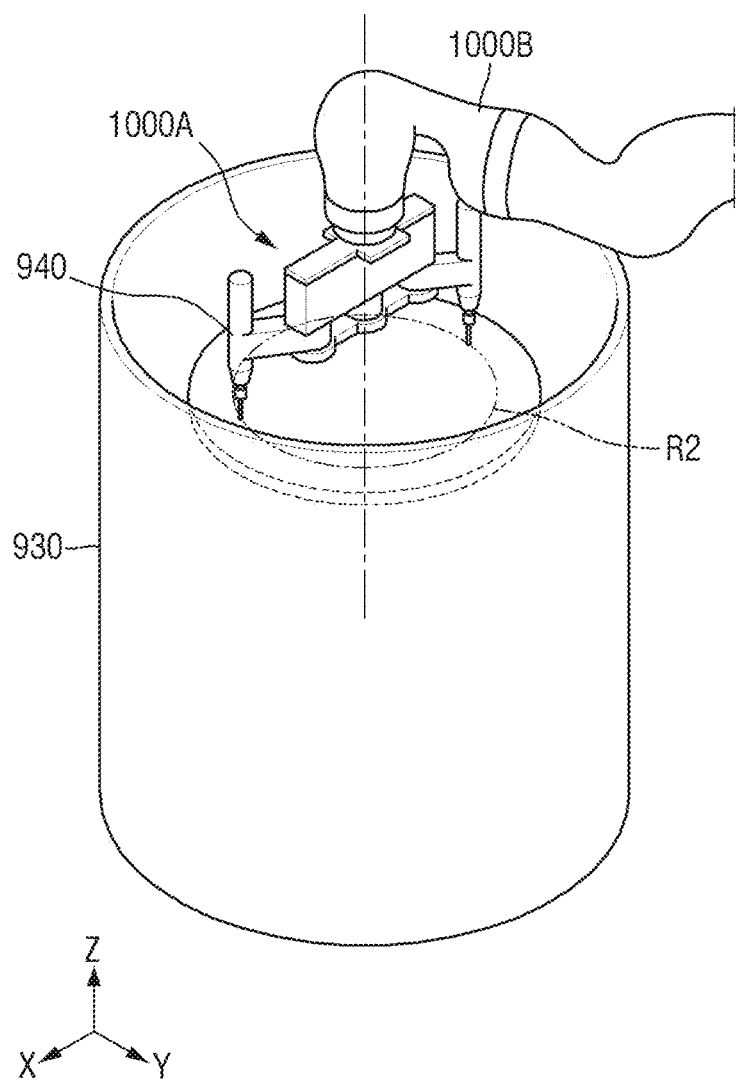
Figure 13:
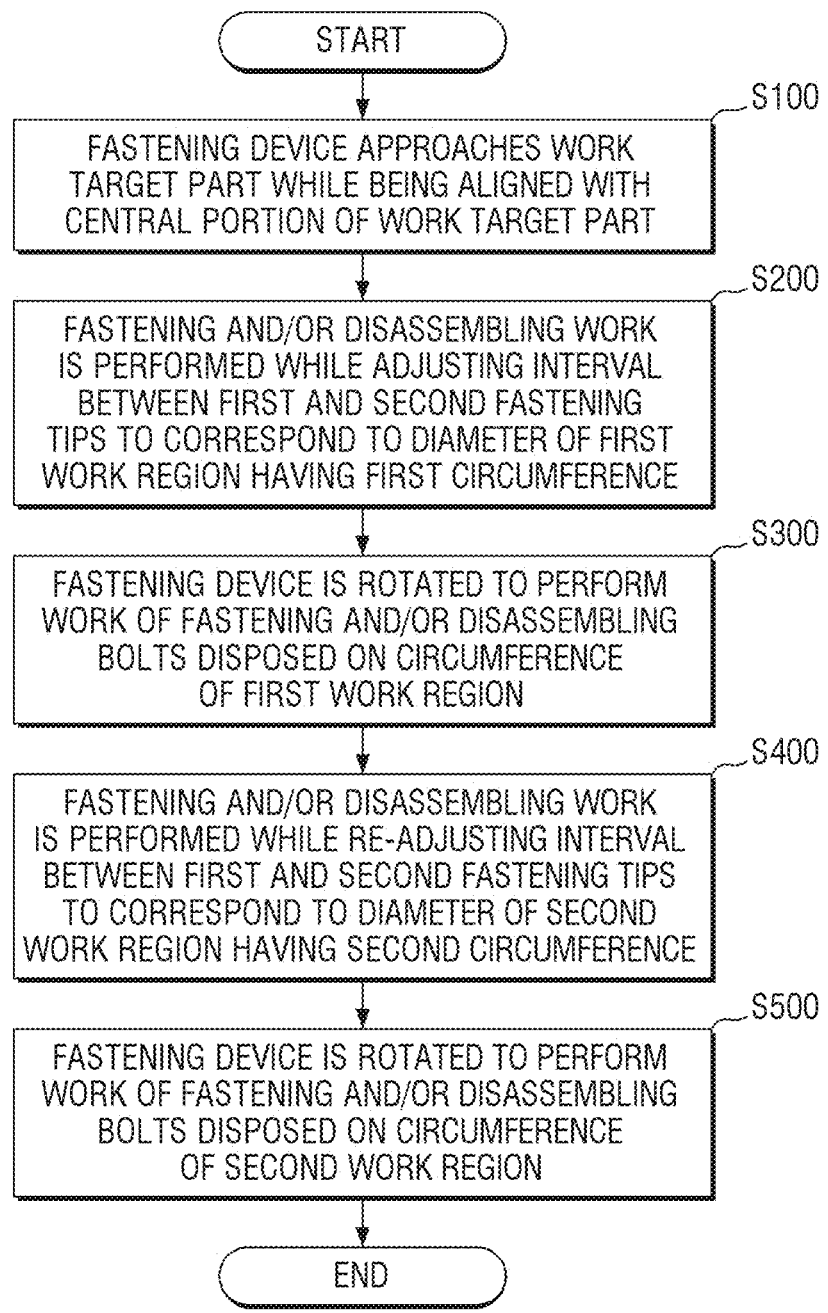
FIG. 13 is a flowchart for describing an operation of the fastening device according to some exemplary embodiments.

Referring to FIGS. 12 and 13, the fastening device 1000A may be rotated compared to a rotation angle illustrated in FIG. 11. For example, the fastening device 1000A may be rotated by 90 degrees compared to the rotation angle illustrated in FIG. 11. The fastening device 1000A may perform a work of fastening and/or loosening the fasteners disposed on the circumference of the second work region R2 (S500). In FIG. 11 and FIG. 12, the rotation angle and rotation direction of the fastening device 1000A are not limited to those illustrated.

Periodic maintenance of semiconductor facilities may involve the fastening and/or disassembling of work target parts secured by numerous fasteners. When these fasteners are individually fastened and/or loosened, the work time may be high, and it may be difficult to obtain a uniform pressure distribution applied by the fasteners around the work piece.

According to some exemplary embodiments, a plurality of fastening tools 310 and 320 may be simultaneously rotated by using a fastening device and fastening system including a belt and a pulley. That is, in some exemplary embodiments, the connection portions 120 and 130 may be relatively rotated with respect to the support portion 110. The fastening tools 310 and 320 may be connected to the connection portions 120 and 130. A plurality of fasteners may be simultaneously fastened and/or loosened by the fastening tools 310 and 320. As a result, a work time for fastening and/or loosening the fasteners may be reduced, and a uniform pressure distribution around the work target part may be obtained. That is, fastening and/or loosening of the fasteners may be simultaneously performed in a work target region at various radii using a fastening device that may be smaller than a conventional one device configured for manipulating individual fasteners, one at a time.

Exemplary embodiments of the present disclosure have been described above with reference to the accompanying drawings, but the present disclosure may be implemented in various different forms, and those skilled in the art to which the present disclosure pertains may understand that the present disclosure may be implemented in other specific forms without changing the technical spirit or essential features of the present disclosure. Therefore, it should be understood that exemplary embodiments described herein are illustrative in all aspects and not restrictive.

What is claimed is:

1. A fastening device comprising:
   a support portion including a first end portion and a second end portion, and a central portion between the first end portion and the second end portion;
   a first pulley, a second pulley, and a third pulley rotatably disposed on the central portion, the first end portion, and the second end portion, respectively;
   a first connection portion and a second connection portion respectively rotatably disposed on the first end portion and the second end portion, and respectively connected to the second pulley and the third pulley;
   a first fastening tool and a second fastening tool respectively connected to the first connection portion and the second connection portion; and
   a motor connected to the first pulley,
   wherein a force generated by the motor and provided to the first pulley is at least partially transmitted to the second pulley and the third pulley to vary a distance between the first fastening tool and the second fastening tool.

2. The fastening device of claim 1, wherein the second pulley and the third pulley are connected to the first connection portion and the second connection portions, respectively, and a rotation, relative to the support portion, of the second pulley and the third pulley varies the distance between the first fastening tool and the second fastening tool.

3. The fastening device of claim 1, further comprising a first fastening tip and a second fastening tip respectively mounted on the first fastening tool and the second fastening tool.

4. The fastening device of claim 1, further comprising a motor controller controlling the motor,
   wherein the force provided to the first pulley is controlled by the motor controller.

5. The fastening device of claim 1, further comprising:
   a first bearing supporting a first shaft, wherein the first pulley is disposed on the first shaft;
   a second bearing supporting a second shaft, wherein the second pulley is disposed on the second shaft; and
   a third bearing supporting a third shaft, wherein the third pulley is disposed on the third shaft.

6. The fastening device of claim 1, further comprising:
   a first belt connecting the first pulley and the second pulley, and a second belt connecting the first pulley and the third pulley; and
   a first idle wheel and a second idle wheel providing tension to the first belt and the second belt, respectively,
   wherein the force is at least partially transmitted to the second pulley by the first belt, and the force is at least partially transmitted to the third pulley by the second belt.

7. The fastening device of claim 1, further comprising a frame disposed on the support portion and on the first pulley, the second pulley, and the third pulley,
   wherein the first connection portion and the second connection portion rotate to vary the distance between the first fastening tool and the second fastening tool.

8. The fastening device of claim 7, wherein the first connection portion and second connection portion rotate toward an inside of the frame and the distance between the first fastening tool and the second fastening tool becomes a first distance.

9. The fastening device of claim 7, wherein the first connection portion and second connection portion rotate toward an outside of the frame and the distance between the first fastening tool and the second fastening tool becomes a second distance.

10. The fastening device of claim 1, wherein the first connection portion and the second connection portion rotate so that an angle formed by the support portion and the first connection portion, and an angle formed by the support portion and the second connection portion are about 180 degrees, respectively.

11. The fastening device of claim 1, wherein the support portion further includes a third end portion spaced apart from each of the first end portion, the second end portion, and the central portion,
the fastening device further includes a fourth pulley rotatably disposed on the third end portion;
a third connection portion rotatably disposed on the third end portion and connected to the fourth pulley; and
a third fastening tool connected to the third connection portion,
wherein when the force generated by the motor and provided to the first pulley is at least partially transmitted to the fourth pulley to vary a distance between the third fastening tool and the first fastening tool and a distance between the third fastening tool and the second fastening tool.

12. The fastening device of claim 11, further comprising:
a third fastening tip mounted on the third fastening tool;
a third belt connecting the first pulley and the fourth pulley; and
a third idle wheel providing tension to the third belt,
wherein force is at least partially transmitted to the fourth pulley by the third belt.

13. A fastening device comprising:
a support portion including a first end portion and a second end portion, and a central portion between the first end portion and the second end portion;
a first pulley, a second pulley, and a third pulley rotatably disposed about a first shaft, a second shaft, and a third shaft disposed on the central portion, the first end portion, and the second end portion, respectively;
a first connection portion and a second connection portion respectively rotatably disposed on the first end portion and the second end portion, and respectively connected to the second pulley and the third pulley;
a first fastening tool and a second fastening tool respectively connected to the first connection portion and the second connection portion; and
a motor generating a force for rotating the first pulley, the second pulley, and the third pulley,
wherein the force generated by the motor simultaneously rotates the first fastening tool and the second fastening tool relative to the support portion.

14. The fastening device of claim 13, wherein the rotation of the second pulley and the third pulley rotates the first connection portion and the second connection portion, respectively, relative to the support portion, and varies a distance between the first fastening tool and the second fastening tool.

15. The fastening device of claim 13, further comprising:
a first bearing supporting the first shaft, wherein the first pulley is disposed on the first shaft;
a second bearing supporting the second shaft, wherein the second pulley is disposed on the second shaft; and
a third bearing supporting the third shaft, wherein the third pulley is disposed on the third shaft.

16. The fastening device of claim 13, wherein the support portion further includes a third end portion spaced apart from each of the first end portion, the second end portion, and the central portion,
the fastening device further includes a fourth pulley rotatably disposed about a fourth shaft on the third end portion;
a third connection portion rotatably disposed on the third end portion and connected to the fourth pulley; and
a third fastening tool connected to the third connection portion,
wherein the first fastening tool, the second fastening tool, and the third fastening tool simultaneously rotate relative to the support portion.

17. The fastening device of claim 16, wherein as the second pulley, the third pulley, and the fourth pulley rotate, distances between the first fastening tool, the second fastening tool, and the third fastening tool are varied.

18. The fastening device of claim 16, wherein an angle formed by the first end portion and the second end portion, an angle formed by the second end portion and the third end portion, and an angle formed by the first end portion and the third end portion are a same angle.

19. A fastening device comprising:
a support portion including a first end portion and a second end portion, and a central portion between the first end portion and the second end portion;
a first pulley, a second pulley, and a third pulley rotatably disposed about a first shaft, a second shaft, and a third shaft on the central portion, the first end portion, and the second end portion, respectively;
a first connection portion and a second connection portion respectively rotatably disposed on the first end portion and the second end portion and respectively connected to the second pulley and the third pulley;
a first fastening tool and a second fastening tool respectively connected to the first connection portion and the second connection portion;
a motor generating a force for rotating the first pulley, the second pulley, and the third pulley; and
a motor controller for controlling the motor,
wherein the force is provided to the first pulley by the motor controller, the force is transmitted from the first pulley to the second pulley and the third pulley, and the first connection portion and the second connection portion rotate, relative to the support portion, by the force transmitted to the second pulley and the third pulley.

20. The fastening device of claim 19, further comprising a first fastening tip and a second fastening tip respectively mounted on the first fastening tool and the second fastening tool,
wherein as the first connection portion and the second connection portion rotate, positions of the first fastening tool and the second fastening tool are varied.

* * * * *